US011083070B2

(12) United States Patent
Hovers et al.

(10) Patent No.: US 11,083,070 B2
(45) Date of Patent: Aug. 3, 2021

(54) LIGHTING CONTROL

(71) Applicant: SIGNIFY HOLDING B.V., Eindhoven (NL)

(72) Inventors: Robertus Antonius Jacobus Maria Hovers, Eindhoven (NL); Remco Magielse, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 0 days.

(21) Appl. No.: 16/463,597

(22) PCT Filed: Nov. 21, 2017

(86) PCT No.: PCT/EP2017/079834
§ 371 (c)(1),
(2) Date: May 23, 2019

(87) PCT Pub. No.: WO2018/095876
PCT Pub. Date: May 31, 2018

(65) Prior Publication Data
US 2019/0380188 A1    Dec. 12, 2019

(30) Foreign Application Priority Data

Nov. 25, 2016    (EP) .................................... 16200621

(51) Int. Cl.
*H05B 47/155* (2020.01)
*H05B 47/115* (2020.01)
*H05B 47/165* (2020.01)

(52) U.S. Cl.
CPC ......... *H05B 47/155* (2020.01); *H05B 47/115* (2020.01); *H05B 47/165* (2020.01)

(58) Field of Classification Search
CPC ............ H05B 37/0227; H05B 37/0272; H05B 37/0281; H05B 37/0218; H05B 33/0863;
(Continued)

(56) References Cited

U.S. PATENT DOCUMENTS 6,275,163 B1 *    8/2001  Bogorad ............ H05B 37/0227
                                              315/155
6,791,458 B2 *    9/2004  Baldwin .................. G01S 13/04
                                              340/521

(Continued)

FOREIGN PATENT DOCUMENTS

EP           2139299 A2    12/2009
JP        2006344555 A    12/2006
WO       2016128183 A1     8/2016

*Primary Examiner* — Borna Alaeddini

(57) ABSTRACT

According to a first aspect disclosed herein, there is provided a controller for controlling at least one first luminaire to render lighting scenes in a first environment; the controller comprising: a first input for receiving a lighting sequence defining a first lighting scene to be rendered in the first environment at least until a trigger is received and a second lighting scene to be rendered in response to receiving said trigger in the first environment, thus replacing the first lighting scene; a second input arranged to receive data indicating user presence within the first environment; an output; and a processor arranged to: receive the lighting sequence via the first input; control, via the output, the at least one first luminaire to render the first lighting scene in accordance with the lighting sequence; receive an indication of the trigger and in response thereto, determine, based on data received via the second input, a user presence value within the first environment; and control, via the output, the at least one first luminaire to render the second lighting scene on condition that the determined user presence value does not exceed a predetermined threshold presence value.

17 Claims, 6 Drawing Sheets

(58) Field of Classification Search
CPC ............ H05B 33/0872; H05B 37/0245; H05B 33/0815; H05B 33/0845; H05B 37/02; H05B 37/0209; H05B 33/0806; H05B 33/0854; H05B 37/0254; H05B 39/08; H05B 39/083; H05B 47/155; H05B 47/17; H05B 47/165; H05B 47/115

See application file for complete search history.

(56) References Cited

U.S. PATENT DOCUMENTS

| | | | |
|---|---|---|---|
| 9,949,344 B1* | 4/2018 | Sanchez | H05B 47/155 |
| 10,197,259 B2* | 2/2019 | Chacon | H05B 47/115 |
| 2013/0114051 A1 | 5/2013 | van Doorn | |
| 2013/0131882 A1* | 5/2013 | Verfuerth | H05B 47/16 |
| | | | 700/295 |
| 2014/0309806 A1* | 10/2014 | Ricci | G06F 21/32 |
| | | | 701/1 |
| 2014/0333766 A1* | 11/2014 | Enohara | H05B 47/125 |
| | | | 348/143 |
| 2015/0282282 A1* | 10/2015 | Breuer | H05B 37/0272 |
| | | | 315/152 |
| 2015/0289338 A1 | 10/2015 | Hochman | |
| 2016/0007423 A1 | 1/2016 | Aliakseyeu et al. | |
| 2016/0242008 A1* | 8/2016 | Tu | H04W 4/40 |
| 2016/0323972 A1 | 11/2016 | Bora et al. | |

\* cited by examiner

|  | Living Room | Dining Room | Kitchen | Bathroom | Bedroom |
|---|---|---|---|---|---|
| Morning | - | Energize | Breakfast | Energize | Sunrise Scene |
| Dinner | Relax | Relax | Cooking | - | - |
| Evening | Relax | Background Scene | Functional Lighting | - | - |
| Go to Bed | Off | - | - | Nightlight | Sunset Scene |
| Night | - | - | - | Nightlight | Nightlight |

Figure 4

LIGHTING CONTROL

CROSS-REFERENCE TO PRIOR APPLICATIONS

This application is the U.S. National Phase application under 35 U.S.C. § 371 of International Application No. PCT/EP2017/079834, filed on Nov. 21, 2017, which claims the benefit of European Patent Application No. 16200621.7, filed on Nov. 25, 2016. These applications are hereby incorporated by reference herein.

TECHNICAL FIELD

The present disclosure relates to systems and methods for controlling lighting devices to render a lighting scene in an environment.

BACKGROUND

Electronic devices are becoming ever more connected. A "connected" device refers to a device—such as a user terminal, or home or office appliance or the like—that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user device such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected ("smart") lighting systems consist of fixed light sources, which can be controlled through wall-mounted switches, dimmers or more advanced control panels that have pre-programmed settings and effects, or even from an app running on a user terminal such as a smart phone, tablet or laptop. For example, this may allow user to create an ambiance using a wide range of colored lighting, dimming options and/or dynamic effects. In terms of control the most common approach is to replace a light switch with a smart-phone based app that offers extended control over lighting (for example Philips hue, LIFX, etc.).

A lighting scene is a particular overall lighting effect in an environment rendered by the light sources in that environment. E.g. a "sunset" scene may be defined in which the light sources are set to output hues in the red-yellow range of the visible spectrum. Each light source may for example output the different hues (or other setting such as saturation or intensity), or a scene may be rendered by all (or some) lights rendering a single color or similar colors. Note that lighting scenes may be dynamic in that the output of one or more light source changes over time.

Smart lighting systems also allow "lighting sequences" to be implemented. A lighting sequence specifies at least a first scene to be rendered by at least one luminaire during a first time period and a second scene to be rendered by the at least one luminaire during a second time period. More commonly, a lighting sequence specifies a lighting scene to be rendered in each room of a house during different times of a day. For example, a "sunrise" scene in the bedroom and an "ener-gize" scene in the kitchen between 07:30-09:00; a "relax" scene in all rooms between 12:00-18:00; and a "sunset" scene in the bedroom and a "nightlight" scene in the bathroom between 22:00-00:00.

SUMMARY

With pre-specified lighting sequences, the system will advance to the next scene in a given room at the scheduled time. The present invention recognizes that the scheduled time may not always be the best time for the scene transition to occur. For example, if a user is reading a book in a room with a "reading" scene active, he might be annoyed if the lighting scene changes to a "nightlight" scene which is too dim for him to continue reading. It would therefore be desirable to conditionally extend the scheduled time for the scene change.

The present invention addresses the above-outlined problem by using user presence data within a room to identify that a user is in the room and postponing a scheduled scene transition until the user leaves the room.

Hence, according to a first aspect disclosed herein, there is provided a controller for controlling at least one first luminaire to render lighting scenes in a first environment; the controller comprising: a first input for receiving a lighting sequence defining a first lighting scene to be rendered in the first environment at least until a trigger is received and a second lighting scene to be rendered in response to receiving said trigger in the first environment, thus replacing the first lighting scene; a second input arranged to receive data indicating user presence within the first environment; an output; and a processor arranged to: receive the lighting sequence via the first input; control, via the output, the at least one first luminaire to render the first lighting scene in accordance with the lighting sequence; receive an indication of the trigger and in response thereto, determine, based on data received via the second input, a user presence value within the first environment; and control, via the output, the at least one first luminaire to render the second lighting scene on condition that the determined user presence value does not exceed a predetermined threshold presence value.

In embodiments, the trigger is a first time and the lighting sequence defines the first lighting scene to be rendered in the first environment during a first time up to the first time, and the second lighting scene to be rendered in the first environment during a second time period after the first time.

In embodiments, the processor is further arranged to, if the determined user presence value does exceed the predetermined threshold presence value, wait for a delay amount of time and then: determine a new user presence value; and control the at least one first luminaire on condition that the determined new user presence value does not exceed the predetermined threshold presence value.

In embodiments, the at least one first luminaire is a plurality of first luminaires.

In embodiments, the controller is also for controlling a second plurality of luminaires in a second environment (203), and said lighting sequence further defines a third lighting scene to be rendered in the second environment during the first time period up to the first time and a fourth lighting scene to be rendered in the second environment during the second time period after the first time.

In embodiments, the user presence value is whether or not a user is present within the first environment, and said predetermined threshold presence value is that there is not a user present within the first environment.

In embodiments, the user presence value is an amount of user motion within the first environment, and said predetermined threshold presence value is a predetermined threshold motion amount.

In embodiments, the lighting sequence is stored in a memory and received by the processor by accessing the memory via the first input.

In embodiments, the controller further comprises a clock generating the current time, and wherein the processor is arranged to receive the current time from the clock and compare it to the first time to determine whether or not the current time exceeds the first time.

In embodiments, the received data are presence sensor data received from a presence sensor.

In embodiments, the received data are user activity data received from an entertainment device.

In embodiments, the lighting sequence additionally defines a first behavior associated with the first lighting scene to be enacted whilst the first lighting scene is being rendered and a second behavior, different from the first, associated with the second lighting scene to be enacted whilst the second lighting scene is being rendered. The behavior may be, for example, a timeout delay for which the luminaire is to continue rendering a lighting scene such that the luminaire switches to an OFF state at the end of the timeout delay if no user presence is detected within the environment during that time.

According to a second aspect disclosed herein, there is provided a system comprising the controller according to the first aspect and the first plurality of luminaires.

According to a third aspect disclosed herein, there is provided a method of controlling at least one first luminaire to render lighting scenes in a first environment; the method comprising steps of: receiving a lighting sequence, the lighting sequence defining a first lighting scene to be rendered in the first environment at least until a trigger is received and a second lighting scene to be rendered in response to receiving said trigger in the first environment, thus replacing the first lighting scene; controlling the at least one first luminaire to render the first lighting scene in accordance with the lighting sequence; receiving an indication of the trigger and in response thereto determining a user presence value within the first environment based on data indicating user presence within the first environment; and controlling the at least one first luminaire to render the second lighting scene on condition that the determined user presence value does not exceed a predetermined threshold presence value.

According to a fourth aspect disclosed herein, there is provided a computer program product comprising computer-executable code embodied on a computer-readable storage medium arranged so as when executed by one or more processing units to perform the steps according to the method of the third aspect.

According to another aspect disclosed herein, there is provided controller for controlling at least one first luminaire to render lighting scenes in a first environment; the controller comprising: a first input for receiving a lighting sequence defining a first lighting scene to be rendered in the first environment during a first time period up to a first time and a second lighting scene to be rendered in the first environment during a second time period after the first time;

a second input arranged to receive sensor data indicating user presence within the first environment; an output; and a processor arranged to: receive the lighting sequence via the first input; control, via the output, the at least one first luminaire to render the first lighting scene in accordance with the lighting sequence; in response to a current time exceeding the first time, determine, based on sensor data received via the second input, a user presence value within the first environment; and control, via the output, the at least one first luminaire to render the second lighting scene on condition that the determined user presence value does not exceed a predetermined threshold presence value.

BRIEF DESCRIPTION OF THE DRAWINGS

To assist understanding of the present disclosure and to show how embodiments may be put into effect, reference is made by way of example to the accompanying drawings in which:

FIG. 4 is another example of a lighting sequence;

DETAILED DESCRIPTION OF EMBODIMENTS

Figure 1:
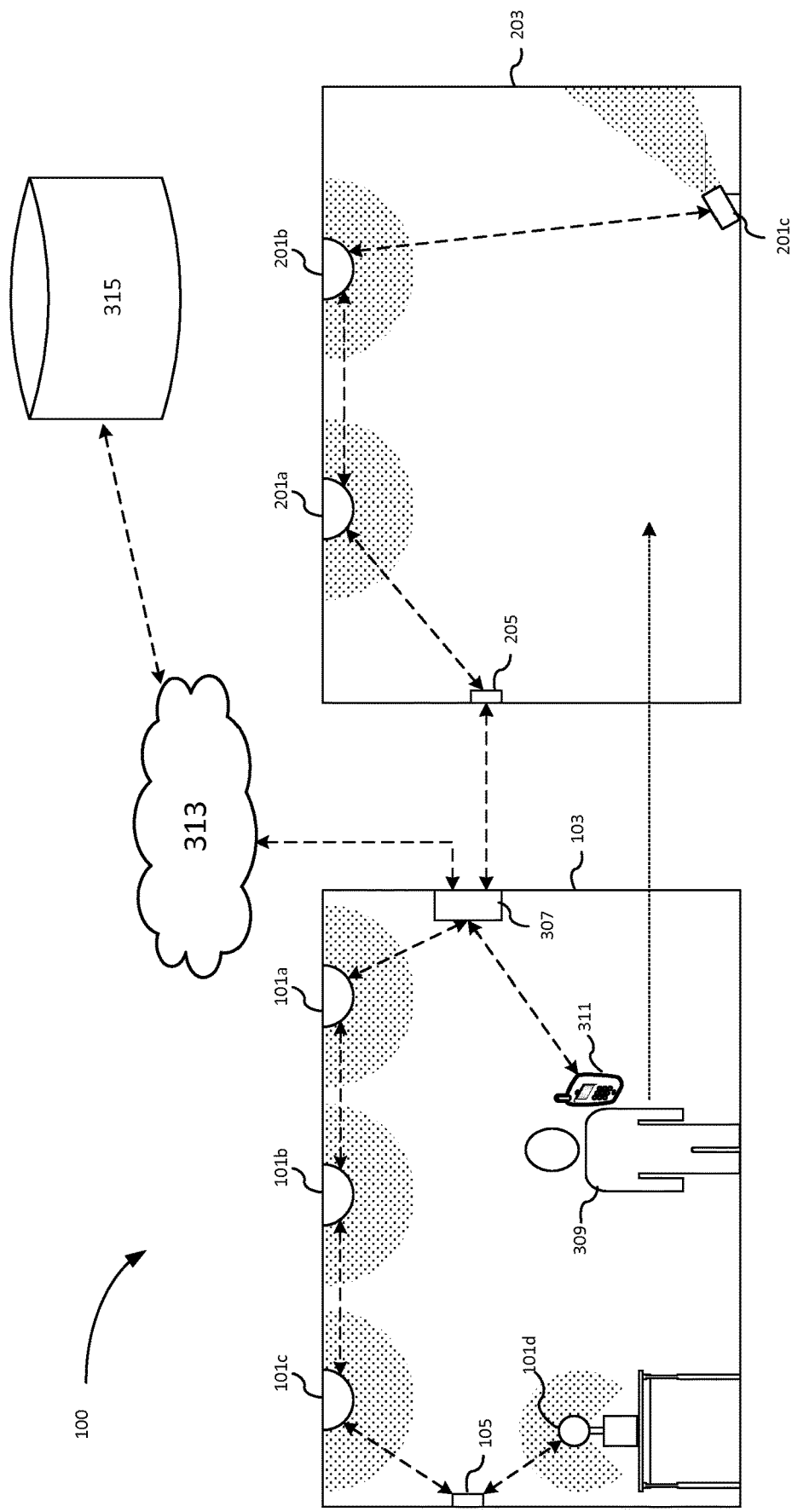
FIG. 1 shows a system according to embodiments of the present invention.

Lighting sequences allow a user of a smart lighting system to predefine (e.g. by user input via their smartphone) scene changes and timings thereof to be enacted by the smart lighting system throughout the day. This idea can also be implemented on a room-by-room basis within the user's house, i.e. specifying different scenes during different time periods for different rooms. In this sense, a lighting sequence may be considered a personal routine of the user. The user can set, e.g. a time for the lights to turn ON and a time when they need to switch OFF. These settings are stored to memory and used by a controller of the system to determine how to control the luminaires in the system (as described in more detail below).

One problem with pre-defined lighting sequences is that the timings are rigidly adhered to by the smart lighting system despite the specific timings in the sequence not always being appropriate for the user.

Smart lighting systems can also comprise one or more presence sensor (e.g. motion sensors). The basic functionality of a sensor is switching light or lights ON when motion is detected and switching them OFF when there is no motion detected after a certain amount of time.

The present invention provides a new way to use the sensors within the smart lighting system to address the above-outlined problems with state-of-the-art lighting sequences.

In a simple embodiment, a presence sensor 'extends' an 'OFF' action which is set by the user as long as there is motion detected in the room; the action will only be executed when there is no motion detected by the sensor (e.g. after a predetermined threshold amount of time). It could also be used for triggering a routine when there is motion detected and not execute the routine when there is not motion detected. A "routine" here refers to a recurring schedule triggering specific light settings (e.g. sunrise scene in the morning, relax scene in the afternoon, sunset scene in the evening).

As an illustrative example, setting a time for lights to switch off at night is very hard for a user to plan exactly as the time the user will go to bed may vary from day to day. It can be very annoying for the user if he is watching TV, reading a book or having a drink with friends and the lights are suddenly turned off because he previously scheduled it to. This is a typical situation where the present invention can postpone an 'OFF' action (or extend the 'ON' situation) which is set by the user as long as there is motion detected in a location. The action will be executed when there is no motion detected by the sensor. In order to make this feature work the system needs to be able to check this an x amount of time before the action is executed.

When the action is postponed a new time can be defined, when the action is 'retried'. For example, switching the lights off is postponed 5 minutes, meaning that in 5 minutes the system will attempt again by re-evaluating whether it can now switch off the lights.

The principle could also work the other way around. If nobody is present in a location, it can be unnecessary to execute a routine that was set for a certain location and therefor can be skipped. If for example no presence or movement was measured in the morning before a 'wake-up light' routine would be executed it could be skipped. This can be viewed as a postponing of the execution in that the scene change is postponed until the next time it is relevant again. For example, if the user is not present in his home the wake-up scene can be postponed until the next day (or whenever he returns and is detected in the bedroom in the morning) when he is actually present to enjoy the wake-up scene. This is particularly useful in embodiments where the lighting sequence repeats periodically (e.g. each day).

FIG. 1 shows a system 100 according to embodiments of the present invention. A first environment 103 contains a first plurality of luminaires 101a-d and a first sensor 105. Luminaires 101a-c are ceiling type luminaires designed to provide illumination in the first environment 103 from above. Luminaire 101d is a free-standing lamp type luminaire placed on a table designed to provide illumination in the first environment 103 from a lower position than the ceiling type luminaires 101a-c. Each of the luminaires 101a-d may be any suitable type of luminaire such as an incandescent light, a fluorescent light, an LED lighting device etc. The plurality of luminaires 101a-d may comprise more than one type of luminaire, or each luminaire 101a-d may be of the same type.

The first sensor 105 may be any suitable type of sensor for sensing data related to user presence within the first environment 103. For example, passive infrared (PIR) sensors, ultrasonic detectors, thermal sensor (e.g. thermal cameras), visible light sensors (e.g. visible light cameras), microphones etc. Other sources of presence and/or motion information within the environment 103 can also be used e.g. data from a user device such as a smart phone, from which presence and/r motion information can be gathered e.g. using known techniques such as active cell phone signals, wireless internet signals etc.

Similarly, a second environment 203 contains a second plurality of luminaires 201a-c and a second sensor 205. Luminaires 201a-b are ceiling type luminaires designed to provide illumination in the second environment 203 from above. Luminaire 201c is wall-washer type luminaire placed on the floor of the second environment 203 and arranged to provide illumination in the second environment 203 by illuminating a wall of the second environment 203. Again, each of the luminaires 201a-s may be any suitable type of luminaire such as an incandescent light, a fluorescent light, an LED lighting device etc. The second plurality of luminaires 201a-c may comprise more than one type of luminaire, or each luminaire 201a-c may be of the same type.

Similarly to the first sensor 105, the second sensor 205 may be any suitable type of sensor as described above in relation to the first sensor 105. The first sensor 105 and second sensor 205 may of different sensor types or may be the same sensor type.

The first plurality of luminaires 101a-d, the first sensor 105, the second plurality of luminaires 201a-c and the second sensor 205 along with a lighting bridge 307 form a connected lighting network. That is, they are all interconnected by wired and/or wireless connections, indicated by dotted lines in FIG. 1. In particular, FIG. 1 shows "chaining" connections such as may be implemented in a ZigBee lighting network, wherein it is not necessary for each device to be directly connected to each other device. Instead, devices are able to relay communication signals which allows for, for example, luminaire 101c to communicate with the lighting bridge 307 by relaying data through luminaires 101b and 101c to lighting bridge 307. Such an arrangement may also sometimes be referred to as a "mesh" network". However, it is not excluded that other network topologies may be employed. For example, a "hub-and-spoke" topology may be used in which each device is directly connected (e.g. wirelessly) to the lighting bridge 307 and not to any other devices in the network.

As another example, each luminaire in the network may be configured according to one communication protocol, such as ZigBee, and the sensors may be configured according to another communication protocol, such as WiFi. Hence, it is appreciated that the luminaires may communicate with each other and the lighting bridge 307 without relaying data through a sensor as shown in FIG. 1, and the sensors 105, 205 may communicate directly with the lighting bridge 307. In any case, it is understood that the lighting bridge 307 is able to communicate, by whatever appropriate means, with each other device in the lighting network.

Lighting bridge 307 is arranged at least to receive input (e.g. from sensors 105, 205) and to send lighting control commands to luminaires 101a-d, 201a-c.

FIG. 1 also shows a user 309 and user device 311 such as a smart phone. The user device 311 is operatively coupled to the lighting bridge 307 by a wired or wireless connection (e.g. WiFi or ZigBee) and hence forms part of the lighting network. User 209 can provide user input to the lighting bridge 307 via the user device 311 using, for example, a graphical user interface of the user device 311. The lighting bridge 307 then interprets the user input and sends control commands to the luminaires 101a-d, 201a-c accordingly. The user device 311 may be used to control the first and/or second plurality of luminaires to render a lighting scene, e.g. by the user 309 selecting the lighting scene and desired luminaires using a GUI of the user device 311.

As illustrated in FIG. 1, lighting bridge 307 may also be provided with a wide area network (WAN) connection such as a connection to the internet 313. This connection, as known in the art, allows the lighting bridge 307 to connect to external data and services such as memory 315. Note that the wireless connection between user device 311 and the lighting bridge 307 is shown in FIG. 1 as a direct connection, but it is understood that the user device 311 may also connect to the lighting bridge 307 via the internet 313.

Figure 2:
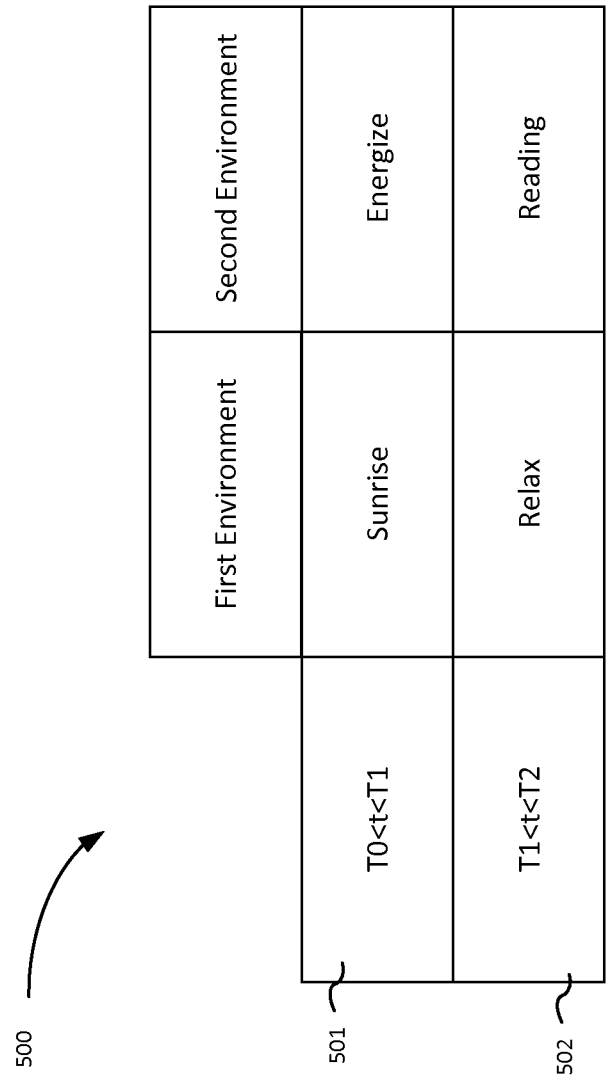
FIG. 2 is an example of a lighting sequence.

The memory 315 stores a lighting sequence 500, an example of which is shown in FIG. 2. The lighting sequence 500 specifies a lighting scene for each of the first environment 103 and the second environment 203 for both a first time period 501 and a second time period 502.

Figure 3:
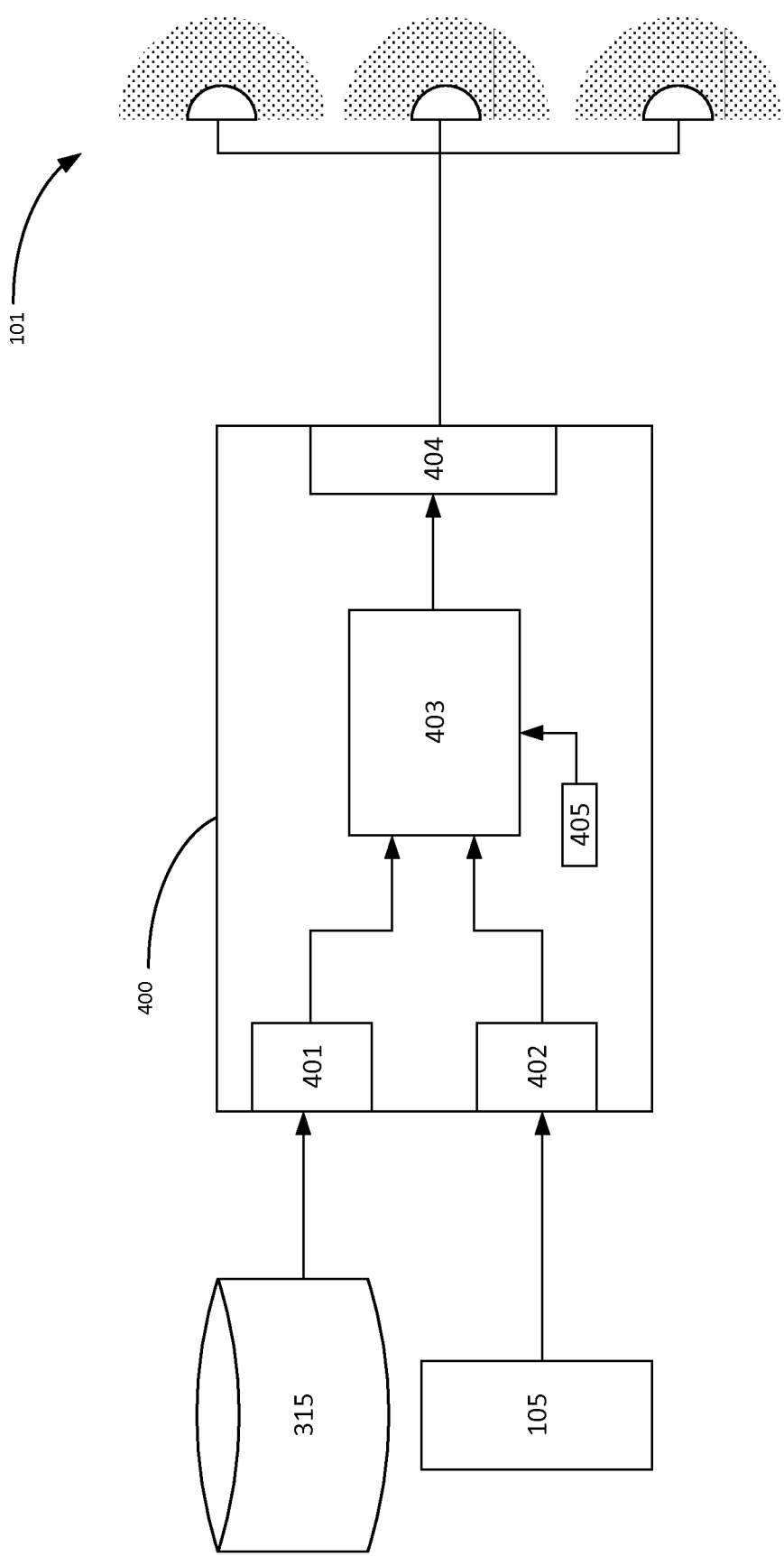
FIG. 3 is a block diagram illustrating a controller according to embodiments of the present invention.

FIG. 3 shows a functional block diagram of a controller 400. The controller 400 is a functional block providing the functionality described herein, and the controller 400 may be implemented solely in hardware, software, or in a combination of hardware and software. Hence, it is understood that FIG. 3 is for the purposes of illustration only. That is, it is understood that the controller 400 shown in FIG. 3 represent a functional block which is implemented in the lighting system 100 shown in FIG. 1. For example, the controller 400 may be implemented in the lighting bridge 307, one of the first plurality of luminaires 101a-d, one of the second plurality of luminaires 201a-c, the first sensor 105, the second sensor 205, or the user device 311. It is also understood that the controller 400 may be implemented in a distributed manner with some functionality being implemented in one entity of the lighting system (as mentioned above) and other functionality implemented in one or more other entities of the lighting system.

The controller 400 comprises a first input 401, a second input 402, a processor 403, an output 404, and a clock 405. The first input 401 and the second input 402 are arranged to provide data to the processor 403 which is in turn arranged to receive these data, process them to generate lighting control commands, and to provide the generated lighting control commands to the output 404. The processor 403 is also arranged to receive data from the clock 405.

The first input 401 is arranged to enable the processor 403 access to memory 315. Hence, the first input 401 is operatively coupled to the memory 315 for example by a network such as network 313 or via wired connection. The memory 315 may also be an internal memory to the controller 400 in which case the first input 401 may preferably be connected to the memory 315 by a direct wired connection.

The second input 402 is arranged to receive sensor data. FIG. 3 shows the second input 402 being operatively coupled to just first sensor 105, but it is appreciated that the second input 402 may receive data from multiple sensors (e.g. also from sensor 205).

The clock 405 generates a current time value (e.g. a UNIX time stamp) and provides it to the processor 403, as is well-known in the art.

In operation, the controller 400 is arranged to control the luminaires via the output 404 in accordance with the lighting sequence. That is, the controller 400 retrieves the lighting sequence 500 from memory 315 and determines therefrom the lighting scene to be rendered by each of the first plurality of luminaires 101a-d and the second plurality of luminaires 201a-c. To do so, the controller 400 retrieves the current time "t" from clock 405 and determines whether the current time falls within any of the time periods specified in the lighting sequence 500. The controller 400 then controls the luminaires to render the lighting scenes as specified by the determined time period. It is appreciated that only two time periods 501, 502 are shown in FIG. 2 for clarity, and that any number of time periods (e.g. 3 or more) may be specified in the lighting sequence 500. Similarly, only two environments are shown in the lighting sequence 500 of FIG. 2 to correspond to the system illustrated in FIG. 1, but that more or fewer environments may be present.

In the present invention, motion detection or (or, more generally, presence detection) is used to advance between scenes in a lighting sequence. Using time of day and motion detection in specific locations the controller 400 can determine whether to advance to a next scene or not. Preferably, as long as a user stays in a particular room, the system will not advance the lighting in that room to a next scene, even if it was scheduled to do so.

The user can setup a lighting sequence, which is a combinations of scenes for different locations. Depending on the time of day and how the user moves through the house, these scenes can be played out.

The system has to decide which time period in the sequence is currently active. In embodiments, it can do this based on the following data:
Time of the day
Current scene active
Which room/area presence is detected
Number of people in the home
If/How often there are transitions between rooms
Kind and amount of motion As an example, a user is woken up by Sunrise scene in the Bedroom. This stays active until the user goes to the Bathroom or the Kitchen. As long as the user stays in the Kitchen, the Breakfast scene stays active even though a user (potentially a different user) may have set this to turn off at 08:30. A user may leave later, so when he leaves at 08:40 the lights will still be on. Once he has left, the system detects there is no longer any presence and executes the postponed 'off' command.

A transition between two lighting scenes in the same room may be difficult to measure with a single motion sensor. However, this could be detect by combining data from multiple sources, e.g. additionally from cell phone data, then how many people are in the room, what is the volume and motion, are they performing a single activity are all determinable.

FIG. 4 shows an example of a lighting sequence 600 which provides the expected behavior (i.e. which scene to be rendered at what times) for given rooms. Note that if a room is not part of a sequence, nothing is specified, i.e. no specific transition is set—during that time period the luminaire simply continues with its previous setting.

The system will maintain a sequence, until it has a clear indication that another sequence is activate. In our example this means that as long as there is presence detected in the living room in the evening, the 'evening' sequence is maintained. Whenever the user switches off the lights in the living room to go to bed, and motion is detected in the bedroom, the system advances to the 'go to bed' sequence. There may be multiple indications of a specific activity. For example: a Smart TV can report that people are still watching television; a smartphone can indicate that people are still actively using it; or a smart IP camera can determine that people are still in one location of an area. Combinations of these are also particularly useful to corroborate the indication from a single source.

Figure 5A:
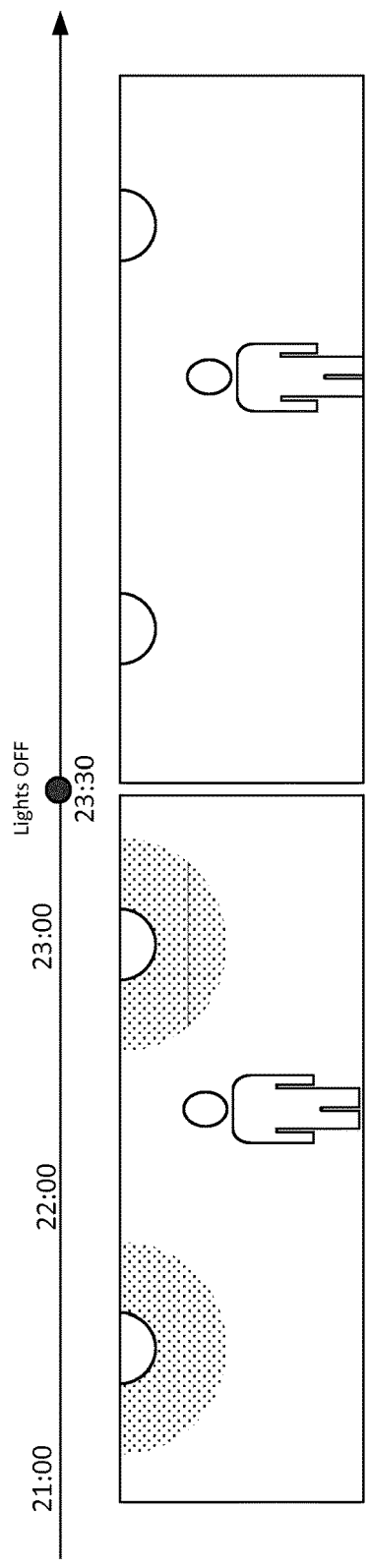
FIG. 5A shows a prior art scenario.
Figure 5B:
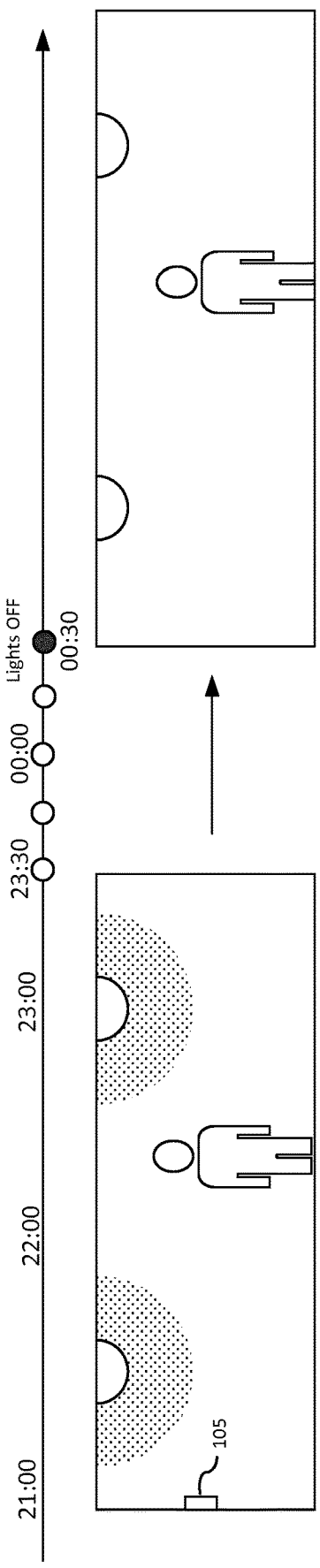
FIG. 5B shows a scenario exhibiting an advantage of the present invention.

FIGS. 5A and 5B show an example of a scheduled scene change (in this example being that the lights are scheduled to turn OFF at 23:30). FIG. 5A shows the prior art approach with no motion sensors, and FIG. 5B shows the method according to the present invention. In each example, the lighting sequence specifies (possibly among other things) that a "relax" scene is to be rendered in the first environment up to 23:30, at which point the lights are to be turned OFF.

In FIG. 5A, a group of users are present in the first environment 103 and are enjoying a "relax" scene as rendered by the first plurality of luminaires 101. That is, controller 400 has determined the current time (e.g. as supplied to the processor 403 by clock 405) and compared this time with the periods specified in the lighting sequence to determine that the relax scene is to be rendered, and controlled the luminaires 101 to render the relax scene.

At 23:30, the controller 400 identifies, similarly based on the lighting sequence, that the lights are to be turned OFF, and controls the luminaires 101 accordingly. This is a problem for the users as they are still in the first environment 103, which has now gone dark.

In FIG. 5A, the system proceeds as before but at 23:30 the controller 400 checks for user presence within the first environment 103. That is, the processor 403 receives user presence data via the second input 402 and processes it to determine a user presence value. The user presence value may be a binary value indicating whether or not there is at least one user present in the first environment 103, may be an integer indicative of an "amount" of user presence (e.g. the number of people present in the first environment 103), or may be a floating point number indicative of an amount of a presence property (e.g. motion) within the first environment 103.

The processor 403 then compares the presence value with a predetermined threshold presence value to determine whether or not to execute the scene change (i.e. to turn the lights off, in this example). In the case of a binary (or integer) value, as described above, this determination comprises determining whether or not there is at least one user present in the first environment 103. In the case of a presence property, as described above, the threshold is a threshold property value and the determination comprises determining whether or not the sensed amount of presence exceeds the threshold. For example, the presence property might be an amount of motion within the first environment 103 in which case the processor 403 determines whether or not the sensed amount of motion exceeds a threshold amount of motion. In either case, the threshold may be stored to memory 315 for use by the processor 403 and may be either a commissioned (default) value or a user-set value (e.g. by the user 309 via user device 311).

In this example, the processor 403 determines that the measured presence value is more than the threshold (i.e. above the threshold) which means that there is enough presence within the environment 103 to not yet enact the scene change. Hence, the controller 400 continues to render the relax scene in the first environment 103.

The processor 403 then waits a delay amount of time (e.g. one minute, five minutes, ten minutes, half an hour, etc.) and again performs the steps described above of determining a presence value and comparing it to the threshold. In the example of FIG. 5B, the processor 403 performs these steps six times, though it is understood that these steps are merely performed until the presence value does not exceed the threshold.

When it is determined that the presence value falls below the threshold, and hence the amount of presence in the first environment 103 has fallen to a low enough level that the system can enact the scene change, the processor 403 controls the luminaires 101 to change their settings to render the new scene (turn OFF in this example).

Thus, advantageously, the scene change is only enacted when there are no people present in the first environment 103 to witness the change in lighting. Note that this advantage can be realized even when the system operates with a presence value (rather than a binary presence or no-presence), for example as a motion level below a threshold means if there is a user present then he is not moving very much and this can be particularly advantageous for example in a bedroom where such a low motion amount may be indicative of the user having fallen asleep—in which case he will also not witness the scene change. In this sense, the present invention may be considered to "hide" scene transitions from observers.

Figure 6:
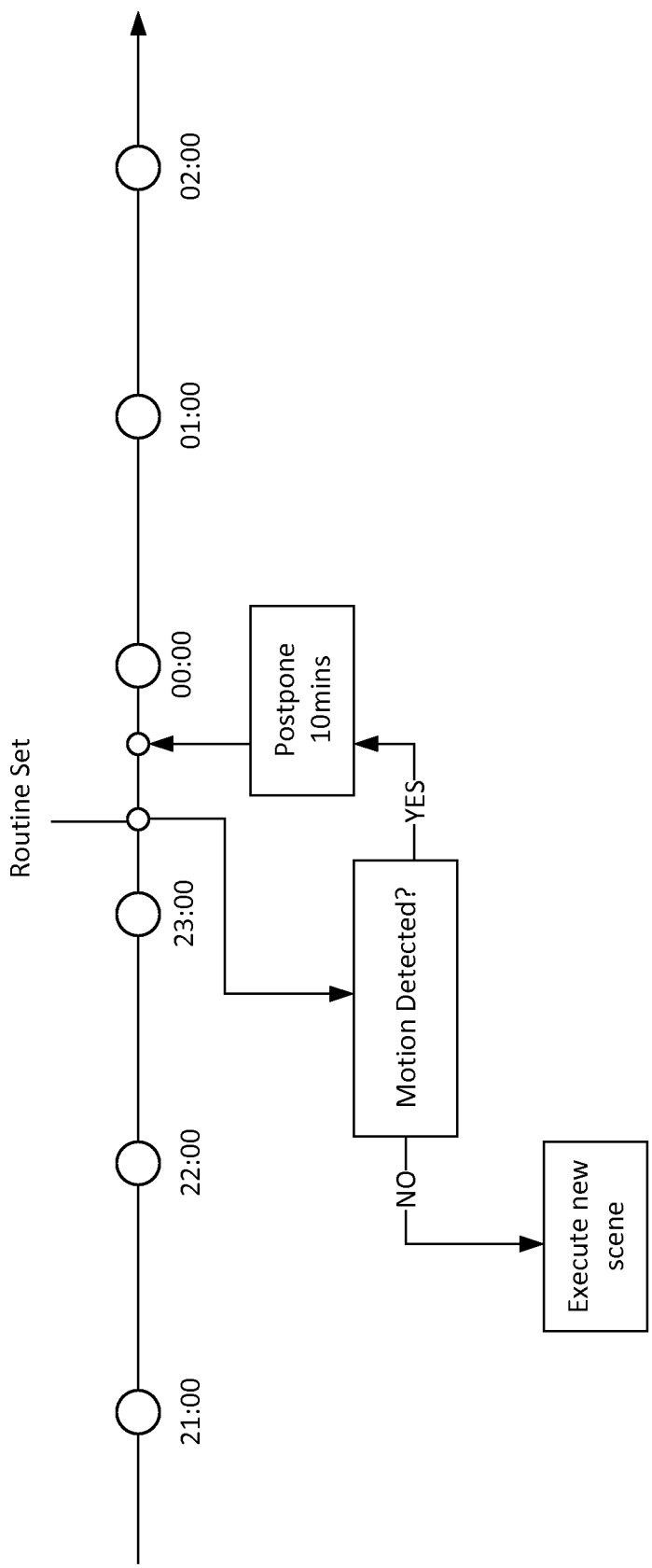
FIG. 6 is a timeline of a method according to the present invention.

FIG. 6 shows a more detailed diagram of the timeline associated with FIG. 5B. In this specific example, the system postpones the scene change by 10 minutes in response to the presence value (motion in this example) exceeding the threshold.

The following are three example usage cases for the purposes of explanation only.

In a first example 'Morning sequence', it is 07:00 and the sensor detects motion in the Bedroom. The user has woken up from his alarm, or from a wake up light schedule that activated the Sunrise scene. The user moves to the Bathroom to take a shower. The system determines that—based on this time of the day and current sequence—an 'Energize' scene should be recalled. Once the user is finished he goes to his kitchen to prepare breakfast. Once he enters the Kitchen his 'Breakfast' scene is applied. The user makes breakfast and moves over to his dining area to eat his breakfast. In the Dining room an 'Energize' scene is activated to prepare the user for his working day. As long as the system detects the user this sequence remains active. Whenever the user would return to the bathroom, or bedroom, respectively the Energize or Sunrise scene would be applied.

Note that in this example, the "activity" of the user is spread across multiple rooms of the house. That is, even though the user is moving between rooms in the house, he is performing the same activity. Another example of this is if a user listens to the same music stream or same song whilst moving through his home. He may be detected by multiple sensors, but his activity remains constant (as determined by, e.g. a music app on his phone, and reported to the lighting system).

In a second example 'Dinner', the user comes home from a hard day of work. He has shopped groceries and prepares dinner for his family. He goes to the kitchen and sets the Cooking scene with his Hue tap. The system recognizes the scene and knows the time of day. Therefore it assumes that the 'Dinner' sequence is activated. Family members come in and sit down in the Living room. The motion sensor detects motion and activates a 'Relax' scene for them to wind down. Once dinner is ready, everyone moves to the Dining room to enjoy their dinner. The 'Relax' scene is activated in the Dining room. As long as there is motion detected in the dining room, the system stays in the current sequence.

In a third example, 'Nightlight', the user wakes up in the middle of the night and needs to go to visit the toilet in the bathroom. When she gets up out of bed, the sensor knows it's the middle of the night and triggers the 'Nightlight' scene which turns on one bedside lamp, giving just enough light to guide her to the bathroom. At the same time the light in the bathroom turns on as well on a low level. When she enters the bathroom the sensor in the bathroom is triggered. Leaving the bath room she turns back to bed and switches off the light with the switch, resetting the sensor as well.

It will be appreciated that the above embodiments have been described only by way of example. Other variations to the disclosed embodiments can be understood and effected by those skilled in the art in practicing the claimed invention, from a study of the drawings, the disclosure, and the appended claims.

For example, the lighting sequence may also specify other behaviors to accompany a particular lighting scene (i.e. a particular cell in FIG. 4). For example, a timeout delay for the lighting may be associated with each scene, e.g. when the 'functional lighting scene' is active in the kitchen (see FIG. 4), the user may not want the lights to be switched off automatically (for example by a schedule) and so the timeout delay may be turned off (set to infinity).

In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A controller for controlling at least one luminaire to render lighting scenes in an environment; the controller comprising:
   a first input arranged for receiving a first lighting sequence defining a first lighting scene to be rendered in the environment during a first time period, receiving a second lighting sequence defining a second lighting scene to be rendered in the environment during a second time period after the first time period, and receiving a third lighting sequence defining a third lighting scene to be rendered in the environment during a third time period after the second time period;
   a second input arranged for receiving data indicating user presence within the environment;
   an output arranged to control the at least one luminaire; and
   a processor arranged for:
   receiving the first lighting sequence, the second lighting sequence, and the third lighting sequence via the first input; and
   controlling, via the output, the at least one luminaire to render the first lighting scene in accordance with the lighting sequence during the first time period;
   wherein the processor is further arranged for:
   determining, upon expiration of the first time period, based on data received via the second input, a user presence value within the environment; and
      if the user presence value does not exceed a predetermined threshold presence value upon termination of the first time period, controlling, via the output, the at least one luminaire to render the second lighting scene; or else,
      extending the first time period and forgoing replacement of the first lighting scene with the second lighting scene during the extension of the first time period: and
   determining, upon expiration of the second time period, based on data received via the second input, the user presence value within the environment; and
      if the user presence value does not exceed a predetermined threshold presence value upon termination of the second time period, controlling, via the output, the at least one luminaire to render the third lighting scene; or else,
      extending the second time period and foregoing replacement of the second lighting scene with the third lighting scene during the extension of the second time period:
   wherein the second lighting scene is different from the first lighting scene, and the third lighting scene is different from the second lighting scene and the first lighting scene.

2. The controller according to claim 1, wherein the processor is further arranged for, after extending the first time period:
   determining, upon expiration of the extended first time period, based on data received via the second input, a new user presence value within the environment; and
   if the new user presence value does not exceed the predetermined threshold presence value, controlling, via the output, the at least one luminaire to render the second lighting scene; or else,
   extending the extended first time period.

3. The controller according to claim 2, wherein the processor is further arranged for amending the predetermined threshold presence value against which the new user presence value is compared, when the first time period is extended.

4. The controller according to claim 1, wherein the at least one luminaire comprises a plurality of luminaires.

5. The controller according to claim 1, wherein the user presence value is whether or not a user is present within the environment, and said predetermined threshold presence value is that there is not a user present within the environment.

6. The controller according to claim 1, wherein the user presence value is an amount of user motion within the environment, and said predetermined threshold presence value is a predetermined threshold motion amount.

7. The controller according to claim 1, wherein the user presence value is a time duration in which the user is present within the environment, and said predetermined threshold presence value is a predetermined user presence time duration.

8. The controller according to claim 1, wherein the lighting sequence is stored in a memory and received by the processor by accessing the memory via the first input.

9. The controller according to claim 1, further comprising a clock generating the current time, and wherein the processor is arranged to receive the current time from the clock and use it to determine whether or not the first time period has expired.

10. The controller according to claim 1, wherein the received data are presence sensor data received from a presence sensor.

11. The controller according to claim 1, wherein the received data are user activity data received from an entertainment device.

12. The controller according to claim 1, wherein the lighting sequence additionally defines a first behavior associated with the first lighting scene to be enacted whilst the first lighting scene is being rendered and a second behavior, different from the first, associated with the second lighting scene to be enacted whilst the second lighting scene is being rendered.

13. A system comprising the controller according to claim 1 and the at least one luminaire.

14. The controller of claim 1, wherein the luminaire is active during the first lighting scene, second lighting scene, and the third lighting scene.

15. The controller of claim 1, wherein the determining of the user presence value includes determining whether a user is using at least one peripheral device.

16. A method of controlling at least one luminaire to render lighting scenes in an environment; the method comprising steps of:
   receiving a first lighting sequence, a second lighting sequence, and a third lighting sequence, the first lighting sequence defining a first lighting scene to be rendered in a first environment during a first time period, the second lighting sequence defining a second lighting scene to be rendered in the first environment during a second time period after the first time period, and the third lighting sequence defining a third lighting scene to be rendered in the first environment during a third time period after the second time period;

controlling the at least one luminaire to render the first lighting scene in accordance with the lighting sequence during the first time period;

determining, upon expiration of the first time period, a user presence value within the environment based on data indicating user presence within the environment; and if the user presence value does not exceed a predetermined threshold presence value, controlling the at least one luminaire to render the second lighting scene; or else extending the first time period and forgoing replacement of the first lighting scene with the second lighting scene during the extension of the first time period; and determining, upon expiration of the second time period, the user presence value within the environment based on data indicating user presence within the environment; and if the user presence value does not exceed a predetermined threshold presence value, controlling the at least one luminaire to render the third lighting scene; or else extending the second time period and forgoing replacement of the second lighting scene with the third lighting scene during the extension of the second time period:

wherein the second lighting scene is different from the first lighting scene, and the third lighting scene is different from the second lighting scene and the first lighting scene.

17. A non-transitory computer program product comprising computer-executable code embodied on a computer-readable storage medium arranged so as when executed by one or more processing units to perform the steps according to the method of claim 16.

* * * * *